United States Patent [19]

Trammell, Jr.

[11] Patent Number: 5,188,003
[45] Date of Patent: Feb. 23, 1993

[54] POWER ASSIST DEVICE FOR A DRIVE MECHANISM

[75] Inventor: Earl M. Trammell, Jr., Chesterfield, Mo.

[73] Assignee: Equi-Cycle Corporation, Chesterfield, Mo.

[21] Appl. No.: 816,220

[22] Filed: Jan. 3, 1992

[51] Int. Cl.⁵ .............................................. G05G 1/14
[52] U.S. Cl. ........................... 74/594.3; 74/594.1; 280/215
[58] Field of Search ............ 74/594.1, 594.3, 594.5; 280/212, 214, 215

[56] References Cited

U.S. PATENT DOCUMENTS

| | | | |
|---|---|---|---|
| 328,709 | 10/1885 | Paessler | 280/212 |
| 567,629 | 9/1896 | Young | 280/215 |
| 642,758 | 2/1900 | Runge | 280/226.1 |
| 704,377 | 7/1902 | Rieber | 280/226.1 |
| 740,156 | 9/1903 | Mendenhall | 74/594.1 |
| 868,329 | 10/1907 | Corbitt | 280/215 |
| 1,564,548 | 12/1925 | Ford | 280/1.192 |
| 1,677,017 | 7/1928 | Boardman | 280/215 |
| 1,707,618 | 4/1929 | Keogh | 280/223 |
| 1,867,731 | 7/1932 | Clarke | 280/215 |
| 1,981,737 | 11/1934 | McIlwain | 208/21 |
| 2,638,359 | 5/1953 | Crumble | 280/215 |
| 3,779,099 | 12/1973 | Trammell, Jr. | 74/594.3 |
| 3,906,807 | 9/1975 | Trammell, Jr. | 74/143 |
| 4,029,334 | 6/1977 | Trammell, Jr. | 280/261 |
| 4,108,459 | 8/1978 | Alvigini | 280/215 |
| 4,133,550 | 1/1979 | Brown | 280/210 |
| 4,159,652 | 7/1979 | Trammell, Jr. | 74/117 |
| 4,416,464 | 11/1983 | Mattox | 280/215 |
| 5,035,678 | 7/1991 | Hageman | 474/50 |

FOREIGN PATENT DOCUMENTS

| | | | |
|---|---|---|---|
| 565863 | 4/1958 | Belgium | 74/594.3 |
| 94319 | 12/1896 | Fed. Rep. of Germany | 74/594.3 |
| 670559 | 11/1929 | France | 74/594.1 |
| 978498 | 11/1950 | France | 74/594.3 |
| 244783 | 9/1946 | Switzerland | 74/594.3 |

Primary Examiner—Leslie A. Braun
Assistant Examiner—Ryan W. Massey
Attorney, Agent, or Firm—Senniger, Powers, Leavitt & Roedel

[57] ABSTRACT

A power assist device for use with a crank-operated drive mechanism including a pair of crank arms extending from opposite ends of a shaft mounted for rotation on a frame. The crank arms rotate the shaft about an axis with the crank arms revolving about the axis. The power assist device includes an energy storing mechanism mounted on the frame and operatively connected to the shaft for movement with the shaft. The energy storing mechanism stores energy during a first portion of a revolution of the crank arms, releases energy during a second portion of the revolution of the crank arms to assist in driving the rotation of the shaft, stores energy during a third portion of the revolution of the crank arms, and releases energy during a fourth portion of the revolution of the crank arms to assist in driving the rotation of the shaft.

19 Claims, 5 Drawing Sheets

POWER ASSIST DEVICE FOR A DRIVE MECHANISM

BACKGROUND OF THE INVENTION

This invention relates generally to drive mechanisms and more particularly to a power assist device for a manually powered, crank-operated drive mechanism such as those employed in bicycles, tricycles and the like.

The standard drive mechanism for a manually powered vehicle such as a bicycle or tricycle includes a shaft having crank arms extending from opposing ends of the shaft, and pedals attached directly or by a linkage to the ends of the crank arms for transmitting power from the vehicle rider's legs and feet to the crank arms for turning the shaft about its long axis. In an ordinary bicycle, the crank arms are driven through a power stroke by extension of first one leg of the rider and then the other. A chief difficulty in operating such a drive mechanism is driving the crank arms past the top dead center position, that is, the position of the crank arms at the maximum extension of a first leg when a second leg first begins to extend. At and near the top dead center position, the largest component of the force applied by the second leg, beginning its power stroke, is directed down the crank arm through the axis of rotation of the shaft so that little torque is applied to turn the shaft. Thus, the rider must supply a large amount of force against the pedals to produce only a little torque. In order to drive the crank arms past the top dead center position, riders typically stand up on the pedals or otherwise change body position so that a greater component of the force applied to the pedals is directed perpendicular to the crank arm and at a distance from the axis of rotation of the shaft. The problem is particularly acute when the bicycle or tricycle is powered with a reciprocating motion of the pedals, because the rider cannot effectively change the top dead center position by changing body position.

I have previously designed drive mechanisms which facilitate the application of torque to the shaft at and near the top dead center position. Reference is made to U.S. Pat. Nos. 3,779,099, 3,906,807, 4,029,334 and 4,159,652, showing these designs. Generally speaking, my prior designs either use alternative links for transmitting force from the pedals to the shaft such that a substantial component of force applied always lies along a line at a distance from the axis of rotation of the shaft, or allowed one crank arm to be accelerated through the top dead center area (i.e., such that the crank arms were separated by less than 180 degrees) during the power stroke of the opposite crank arm. Although these designs make pedaling easier and smoother by effectively eliminating the top dead center position, they require considerable modification to existing bicycles and tricycles.

SUMMARY OF THE INVENTION

Among the several objects and features of the present invention may be noted the provision of a power assist device which can be added to presently existing drive mechanisms for manually powered vehicles, such as bicycles, tricycles and the like, with very little modification to the drive mechanism; the provision of such a power assist device which stores energy during a power stroke portion of the rotation of a crank arm of the drive mechanism and releases the energy around the top dead center position of the crank arm; the provision of such a device which is relatively inexpensive to use and easy to install in production of a manually powered vehicle.

Generally, a power assist device constructed according to the principles of the present invention is used with a crank-operated drive mechanism including a pair of crank arms extending from opposite ends of a shaft mounted for rotation on a frame. The crank arms rotate the shaft about an axis with the crank arms revolving about the axis. The device comprises energy storing means, means mounting the energy storing means on the frame, and means connecting the energy storing means to the shaft. The connecting means is adapted to transmit motion between the energy storing means and the shaft. The energy storing means stores energy during a first portion of a revolution of the crank arms, releases energy during a second portion of the revolution of the crank arms to assist in driving the rotation of the shaft, stores energy during a third portion of the revolution of the crank arms, and releases energy during a fourth portion of the revolution of the crank arms to assist in driving the rotation of the shaft.

In another aspect of the present invention, a manually powered vehicle in combination with the power assist device.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
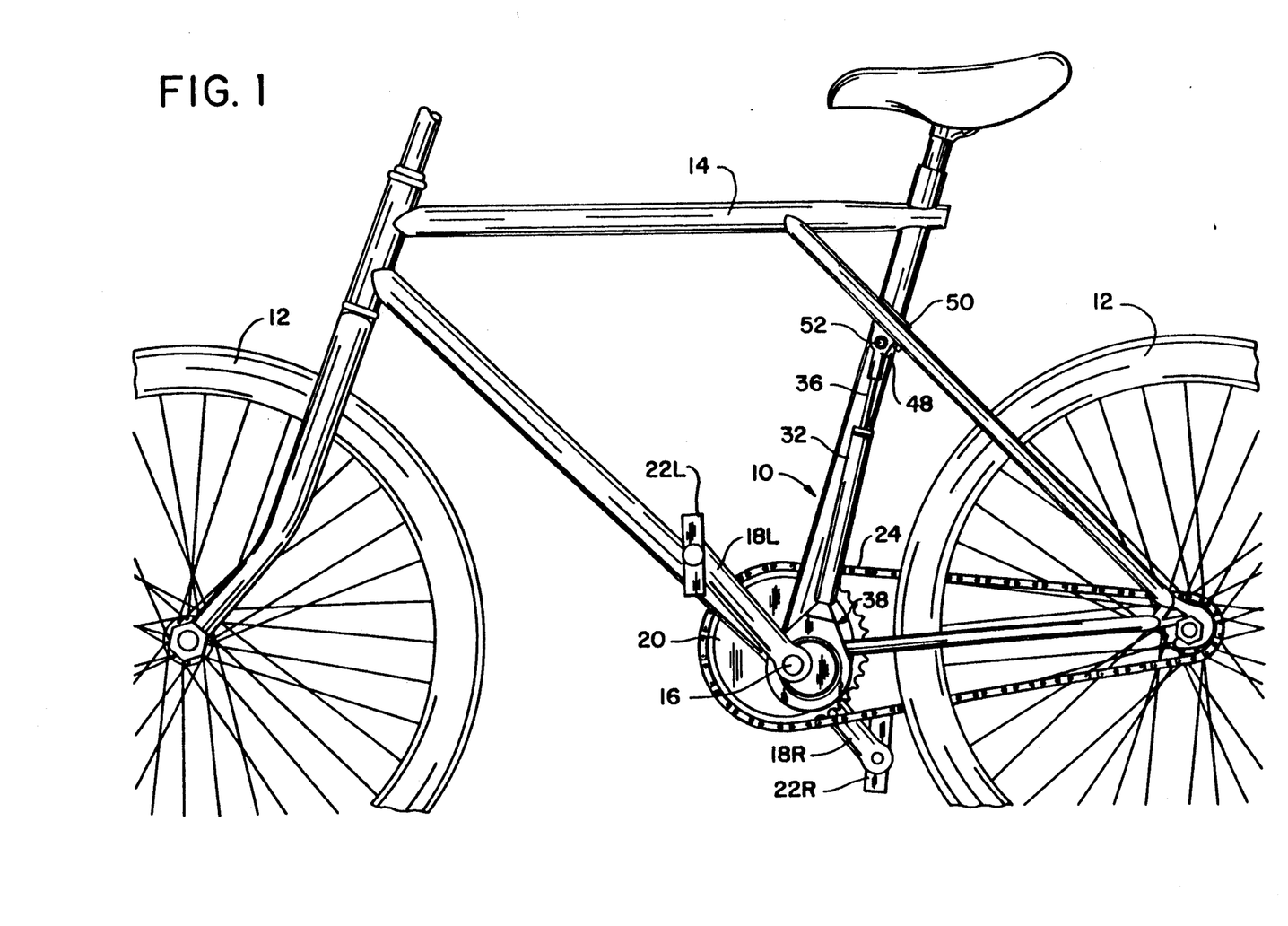
FIG. 1 is a fragmentary elevation of a bicycle with a power assist device.

Referring now to the drawings, and in particular to FIG. 1, a power assist device indicated generally at 10 is shown as attached to a bicycle of standard construction, including wheels 12, a frame 14 and a drive mechanism. The drive mechanism includes a shaft 16 mounted for rotation on the frame 14, a pair of crank arms (designated 18L and 18R, respectively) extending from opposite ends of the shaft and a large sprocket gear 20 attached to the shaft between the crank arm 18R and the frame for rotation with the shaft. Laterally outwardly extending pedals, indicated at 22L and 22R, respectively, are rotatably mounted at the radially outer ends of the crank arms 18L, 18R. The large sprocket gear 20 is connected by a chain 24 to a smaller sprocket gear (not shown) mounted on an axle 28 connecting the rear wheel 12 to the frame 14 for transmitting power from the drive mechanism to the rear wheel.

Although the power assist device 10 is discussed herein as being used on the bicycle of standard construction, it is to be understood that the power assist device can be used with other crank-operated drive mechanisms and still fall within the scope of the present invention. The power assist device 10 of the present invention would, for instance, also be highly useful for drive mechanisms (not shown) in which the crank arms are connected by links to pedals which are driven in linear, reciprocating fashion.

Figure 2:
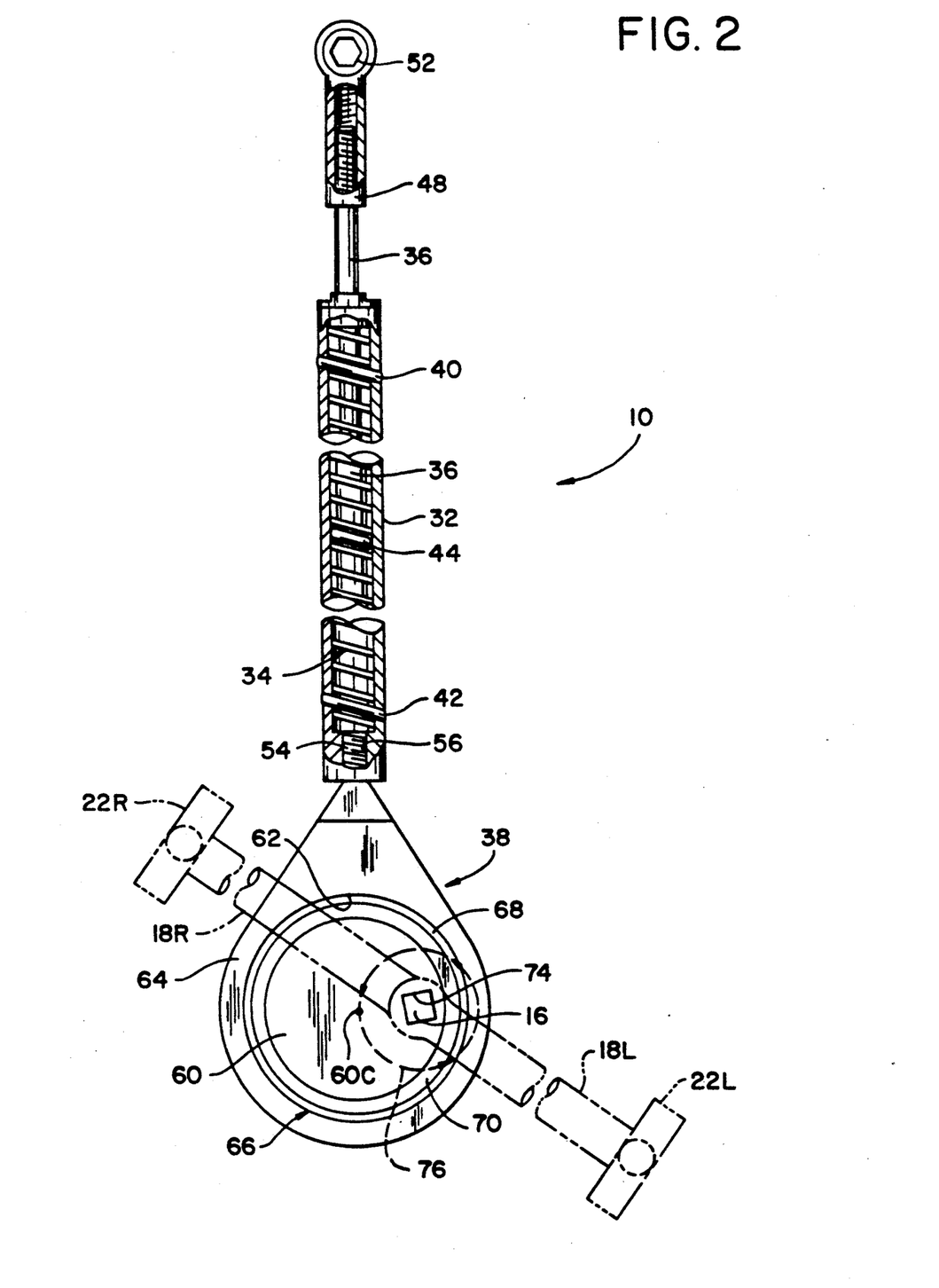
FIGS. 2–4 are partial vertical sections of the power assist device at different positions during one revolution of crank arms of the bicycle drive mechanism.

Referring now to FIG. 2, the power assist device 10 is shown to include a generally tubular housing 32 in which a coil spring generally indicated at 34 is located. A piston rod 36 is received in telescoping relation in the housing 32 from its upper end and through the middle of the convolutions of the coil spring 34. Connecting means, indicated generally at 38, is attached at its upper end to the lower end of the housing 32. The spring 34 is attached to the housing 32 adjacent the upper and lower ends of the housing by first attachment means comprising two pins, designated 40 and 42, extending generally transversely through the housing and between adjacent coils of the spring 34. The spring 34 is also attached to the piston rod 36 by second attachment means comprising a third pin 44 passing through an opening in the piston rod and transversely between adjacent coils of the spring generally midway between the upper and lower ends of the spring. Thus, the ends of the spring 34 are generally fixed relative the housing 32 for motion with the housing, and the middle of the spring is generally fixed relative the piston rod 36.

The upper end of the piston rod 36 is threadably received in an opening in a mounting yoke 48 mounted at its upper end by a bracket 50 on the bicycle frame 14 (FIG. 1). The bracket 50 is secured in a suitable fashion such as by welding to the frame. The yoke 48 is mounted by a bolt 52 which is received through an opening at the upper end of the yoke and in an opening in the bracket 50. The yoke 48 can pivot about the central longitudinal axis of the bolt 52 so that the entire power assist device 10 may swing relative the frame 14 generally in a plane parallel to the lengthwise extension of the bicycle.

Figure 6:
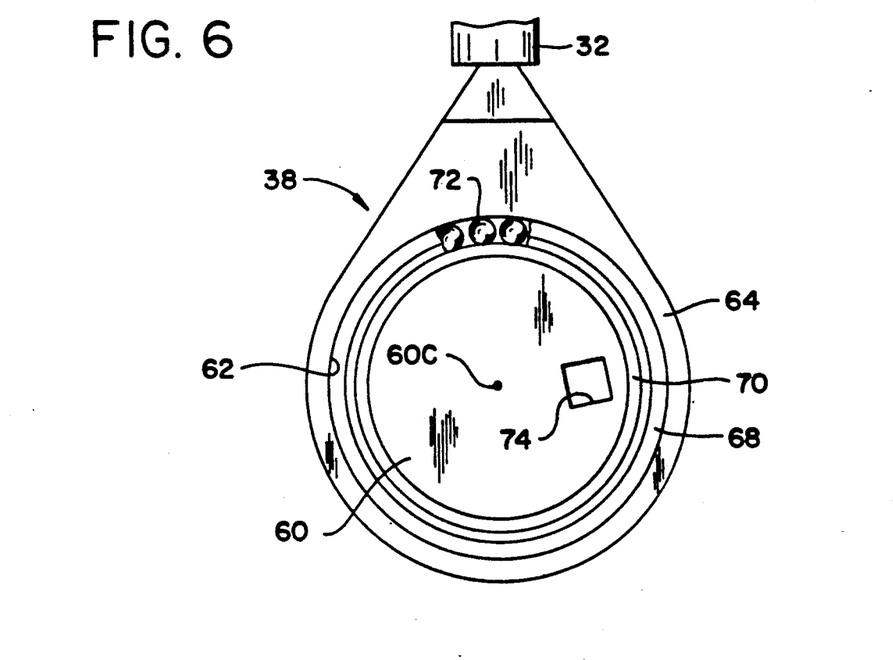
FIG. 6 is an enlarged fragmentary elevation of the power assist device with parts broken away to show details.

The connecting means 38 has generally teardrop shaped contour with a cylindrical projection 54 at its upper end formed with threads for connection in an opening 56 in the lower end of the housing 32. The connecting means 38 includes a generally circular cam 60 held in a circular opening 62 in a cam follower 64 by a bushing indicated generally at 66. As shown in FIG. 6, the bushing 66 includes an annular outer raceway member 68 fixed to the cam follower 64 in the opening 62, and an annular inner raceway member 70 fixed to the periphery of the cam 60. A plurality of ball bearings 72 ride in the raceways 68, 70 thereby allowing rotation of the inner raceway member and cam 60 relative the outer raceway member and cam follower 64 about an axis extending through the center 60C of the cam. The connecting means 38 is attached to the shaft 16 at a position between the frame 14 and the left crank arm 18L (as shown in FIG. 1). The shaft 16 passes through an opening 74 in the cam 60 at a location which is spaced from the center 60C of the cam. As may be seen in FIG. 2, the shaft 16 has a square cross section as it passes through the square opening 74 in the cam so that the cam is turned with the shaft about the axis of rotation of the shaft with the center 60C of the cam moving in an orbit 76 about the axis of rotation.

The eccentric rotation of the cam 60 about the shaft 16 cyclically moves the cam follower 64 from side to side and up and down relative the bicycle frame 14. The housing 32, which is fixed by the cylindrical projection 54 to the upper end of the cam follower 64, moves conjointly with the cam follower. However, the piston rod 36 is mounted on the frame 14 only for pivoting motion from side to side, and does not move vertically with respect to the frame 14. Therefore, as the housing 32 is moved by the cam follower 64, the piston rod 36 extends from and retracts into the housing. The third pin 44 attaches the center of the spring 34 to the piston rod 36, and the pins 40 and 42 fix the upper and lower ends of the spring to the housing, so that as the piston rod extends from the housing, the lower portion of the spring 34 below the third pin 44 and above pin 42 is expanded and the upper portion of the spring portion above the third pin 44 and below the pin 40 is compressed (see FIG. 4). As the piston rod 36 retracts into the housing 32, the upper portion of the spring 34 is expanded and the lower portion compressed (see FIG. 3). In both instances, the spring 34 exerts a force in the direction opposite the movement of the piston rod 36 relative the housing 32. The power assist device 10 is shown with the spring in a neutral or relaxed position in FIG. 2.

Figure 5:
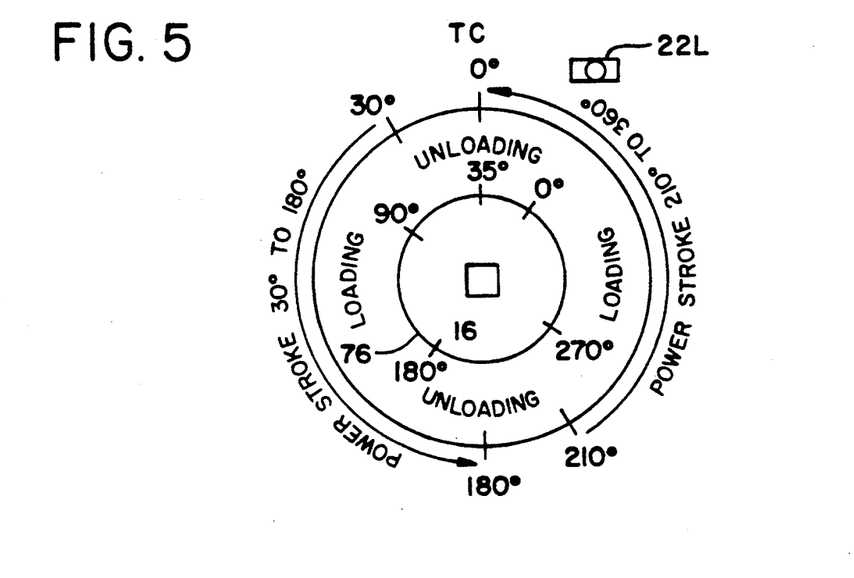
FIG. 5 is a diagram illustrating the operation of the power assist device during one revolution of the crank arms.

The operation of the power assist device 10 during a single rotation of the pedals 22L, 22R (and hence of the crank arms 18L, 18R) and a single orbit 76 of the center 60C of the cam about the axis of rotation of the shaft 16 is illustrated by concentric circles in FIG. 5. The outer circle represents the rotation of the right pedal 22R and crank arm 18R and the inner circle represents the orbit 76 of the cam center 60C. Each orbit of the cam center 60C, which lies on the longitudinal axis of the spring 34, corresponds to one cycle of motion of the spring. Referring to the outer circle, the zero degree position of the right pedal 22R has been chosen as the top dead center position TC of the crank arm 18R. The degree markings on the circles show the angular orientations of the right pedal 22R and crank arm 18R relative the cam center 60C during a single rotation of the right pedal and crank arm. Although shown as being a vertical position for convenience, the true angular orientation of the top dead center position for most bicycles would be slightly rotated in the clockwise direction from the vertical. The exact top dead center position varies somewhat from bicycle to bicycle, and can be changed by the rider changing his or her body position. Therefore, the exact angular relationships discussed herein are for purposes of illustration only. The power assist device 10 can be used with different types of bicycles and other similarly crank-operated, manually powered vehicles having various top dead center positions.

Referring again to FIG. 5, the power stroke portions of a rotational cycle of the pedals 22L, 22R and crank arms 18L, 18R are shown as being 30° to 180° and 210° to 360°. The power stroke from 30° to 180° corresponds to the rider actually applying a strong downward thrust with his leg against the pedal 22R and a high torque to the shaft 16. The power stroke from 210° to 360° corresponds to the rider applying a strong downward thrust on the pedal 22L and a high torque to the shaft 16. There is approximately a 30° "dead spot" between 0° and 30°, and 180° and 210°, where the primary component of the downward force exerted by the rider is substantially parallel to the crank arms 18L, 18R, extending along a line passing through or closely adjacent the axis of rotation of the shaft 16. Thus, there is little or no lever arm for applying torque to the shaft 16 during the dead spot. Of course, the foregoing is somewhat oversimplified in that the lever arm gradually goes to zero as the pedals 22L, 22R approach the top dead center position TC and gradually increase as they pass it. The dead spot ranges of 0° to 30° and 180° to 210° are approximate ranges in which the lever arm is short enough to make further pedalling difficult, particularly when the bicycle is on a grade.

Figure 3:
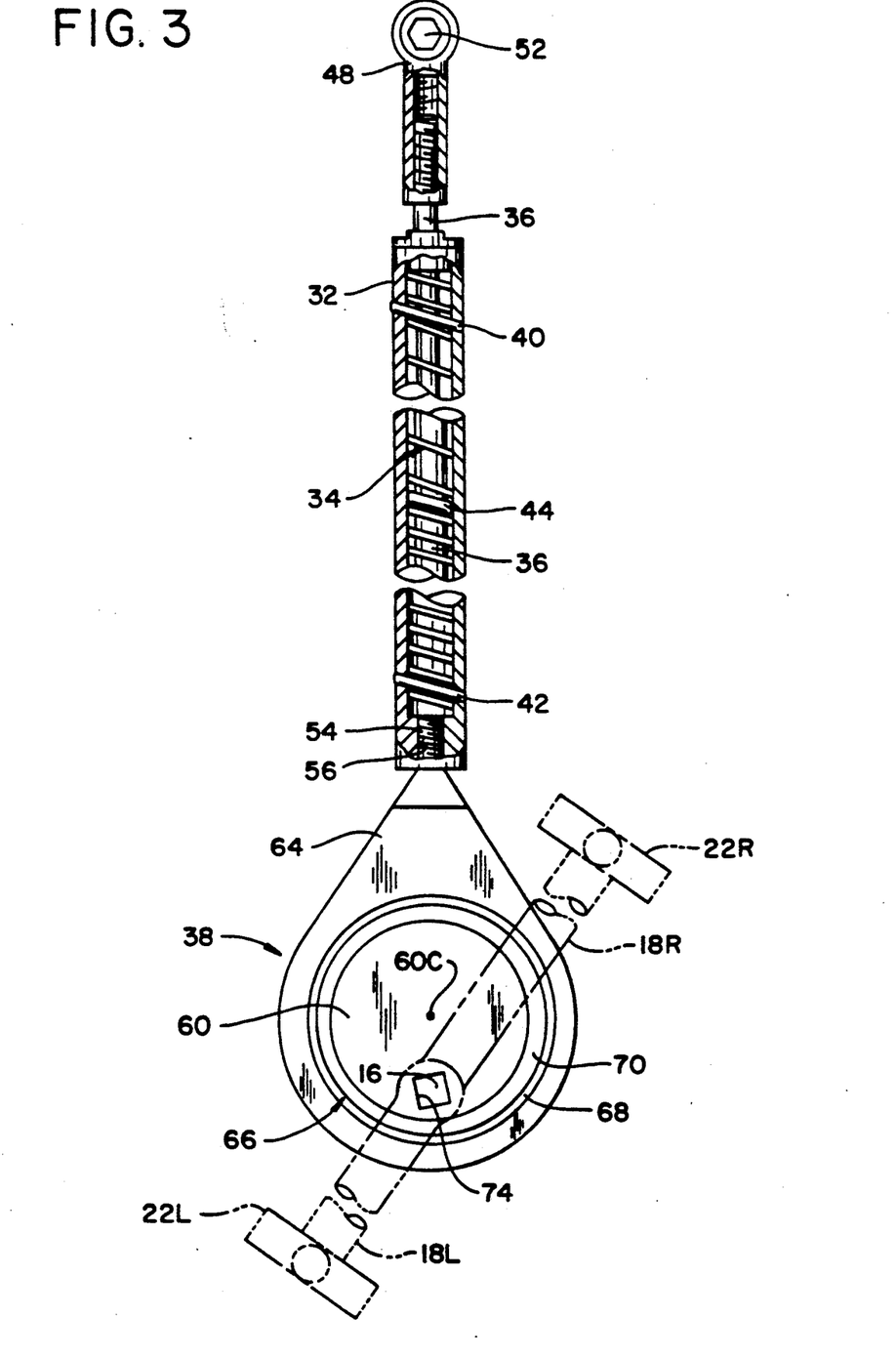

The 0° position of the cam center 60C has been selected for purposes of illustration as the vertical zenith of the cam center in the cycle of rotation when its separation from the pivotal mounting point (i.e., the bolt 52) of the piston rod 36 to the frame 14 is the least. However, because the rotation of the cam center 60C is offset from the right pedal 22R and crank arm 18R, the 0° position is rotated clockwise from the vertical in FIG. 5 to illustrate the angular locations of the pedal 22R and crank arm 18R relative to the cam center 60C. In the 0° position, as shown in FIG. 3, the cam 60 has pushed the cam follower 64 and hence the housing 32 as close to the mounting point of the piston rod 36 as it will come in a rotational cycle. The piston rod 36 is retracted into the housing 32 and the spring 34 is displaced from its relaxed position as shown with the coils above the third pin 44 loaded in tension, and the coils below the third pin 44 loaded in compression. This may be referred to as the "top fully loaded position" of the spring. Further rotation of the cam 60 in the forward direction about the axis causes the housing 32 to move downwardly away from the pivotal mounting point and forward. The spring 34 is allowed to move toward its relaxed position by the downward motion of the housing 32 and corresponding extension of the piston rod 36. As the spring 34 unloads, it applies a downward force on the cam follower 64 which transmits the force to the cam 60 which applies a torque tending to rotate the shaft 16.

Figure 4:
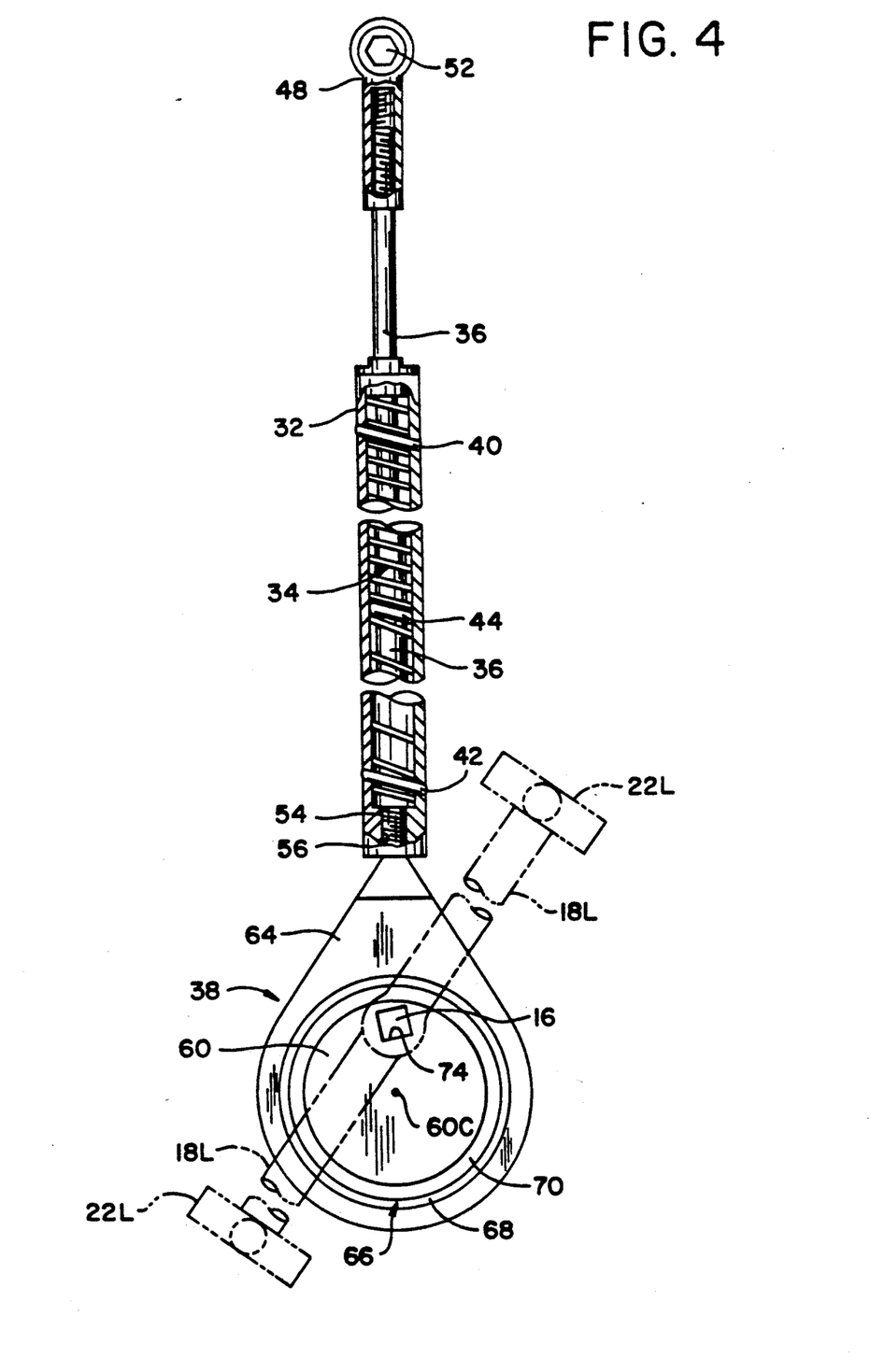

The spring 34 continues to apply a torque until the it reaches the relaxed position shown in FIG. 2, which is the 90° position of the cam center 60C. In this position, the center 60C of the cam and the axis of rotation of the shaft 16 lie in a plane perpendicular to the longitudinal axis of the housing 32 (and spring 34), and the cam center is midway between its farthest and nearest spacing from the location of the mounting point of the piston rod 36 on the frame 14. As the cam center 60C continues its generally downward motion, the spring 34 is again loaded. As shown in FIG. 4, in its "bottom fully loaded position" at 180° of rotation, the coils of the spring 34 above the third pin 44 are loaded in compression, and the coils of the spring 34 below the third pin 44 are loaded in tension. The cam center 60C is at its furthest distance from the pivotal mounting point of the piston rod 36 and the rod is at its point of furthest extension from the housing 32. Further rotation of the cam center 60C will result in a generally upward movement of the housing 32 and an unloading of the spring 34. As the spring 34 unloads, it applies a generally upward force to the cam follower 64 which pulls the cam 60 upward and exerts a torque on the shaft 16. The spring 34 is again relaxed at the 270° position of the cam center 60C when the cam center is midway toward its top (0°) position. Movement of the cam center 60C from the 270° position loads to the 0° position loads the spring 34 again.

Referring again to FIG. 5, the angular location of the right pedal 22R and crank arm 18R during the loading and unloading of the spring 34 may be seen. The 0° or top dead center position TC of the pedal 22R and crank arm 18R is offset 35° in a forward rotational direction from the 0° position of the cam center 60C. Stated another way, the cam center 60C rotates 35° ahead of the nearest pedal (i.e., pedal 22R). Therefore, when the right pedal 22R and crank arm 18R traverse the "dead spot" between 0° and 30° after top dead center, the spring 34 is unloading and provides its power assist for driving the shaft 16. It is to be understood that the exact number of degrees of the offset can vary from 35° and still fall within the scope of the present invention. It is, of course, important that the spring 34 be unloading during the time the pedal and crank arm pass through the top dead center position TC and the "dead spot" immediately thereafter.

The spring 34 is loaded during a portion of the power stroke of the right pedal 22R from 55° to 145°. That is, part of the force applied by the rider to the pedal 22R goes to displacing the spring 34 from its relaxed position. In this way, the spring 34 stores a portion of the energy supplied by the rider to push the pedal 22R during the power stroke. Some of the energy is recovered for driving the shaft 16 during the 145° to 235° rotation of the right pedal 22R and crank arm 18R when the spring 34 is unloading, and the right pedal 22R and crank arm 18R pass through a bottom dead center position. At the same time, the left pedal 22L and crank arm 18L pass through the top dead center position TC. The spring 34 is reloaded during a portion of the power stroke of the left pedal 22L corresponding to the rotation of the right pedal 22R from 235° to 325°. Some of the stored energy is recovered for driving the shaft 16 during the 325° to 55° rotation of the right pedal 22R when the spring 34 is again unloading and the right pedal and crank arm 18R pass through the top dead center position TC.

It may be seen that the power assist device 10 of the present invention stores a portion of the power exerted by the rider during a first portion of the rotational cycle, releases energy to assist in driving the shaft 16 during a second portion of the rotational cycle, stores energy again during a third portion of the rotational cycle, and releases energy again during a fourth portion of the rotational cycle. The power assist device 10 absorbs some of the energy exerted during the power strokes and reapplies it through the top dead center positions of the pedals 22L, 22R and crank arms 18L, 18R to push the pedals and crank arms past top dead center and to provide a smoother, more efficient application of torque to the shaft through the entire cycle of rotation. The device 10 is believed to be particularly useful in a vehicle powered by reciprocating motion of the pedals, which are connected to the crank arms by links (not shown). The rider cannot apply greater torque to the shaft by changing his body position, as can be done when the pedals are driven in a rotary fashion, because the links fix the direction of the force applied from the pedals to the crank arms.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A power assist device for a crank-operated drive mechanism including a pair of crank arms extending from opposite ends of a shaft mounted for rotation on a frame, the crank arms being adapted to rotate the shaft about an axis with the crank arms revolving about the axis, the device comprising energy storing means, means for mounting said energy storing means on the frame, and means for connecting said energy storing means to the shaft, said connecting means being adapted to transmit motion between said energy storing means and the shaft, said energy storing means storing energy during a first portion of a revolution of the crank arms, releasing energy during a second portion of the revolution of the crank arms to assist in driving the rotation of the shaft, storing energy during a third portion of the revolution of the crank arms, and releasing energy during a fourth portion of the revolution of the crank arms to assist in driving the rotation of the shaft, the first through fourth portions occurring consecutively and one after another during a single revolution of the crank arms.

2. A power assist device as set forth in claim 1 wherein said mounting means comprises means for pivotally attaching said energy storing means to the frame generally at a first end of said energy storing means.

3. A power assist device as set forth in claim 2 wherein said energy storing means comprises spring means having a relaxed position in which the spring exerts no force on said connecting means or the shaft, said spring means being displaced from the relaxed position during the first and third portions of the revolution of the crank arms, and returned to its relaxed position during the second and fourth portion of the revolution.

4. A power assist device as set forth in claim 3 wherein said energy storing means comprises generally tubular housing for housing said spring means, first means attaching said spring means to the housing generally at opposite longitudinal ends thereof, a piston rod telescopically received in the housing, and second means attaching said spring means to the piston rod generally midway between said first attaching means such that approximately one-half of the spring is located on one side spring is located on an opposite side of said second attachment means.

5. A power assist device as set forth in claim 4 wherein said connecting means comprises a cam fixedly attached to the shaft for conjoint rotation therewith, and a cam follower attached to the housing, the cam slidably engaging the cam follower.

6. A power assist device as set forth in claim 5 wherein the can is generally circular and the cam follower has an opening therein adapted to slidingly hold the cam therein.

7. A power assist device as set forth in claim 1 wherein said connecting means transfers energy to said energy storing means during said first and third portions of the revolution of the crank arms, and transfers energy from said energy storing means to the shaft during said second and fourth portions of the revolution of the crank arms.

8. A power assist device as set forth in claim 7 wherein said connecting means transfers energy to the shaft for rotation thereof when the crank arms pass through their respective top dead center positions.

9. A power assist device for a crank-operated drive mechanism including a pair of crank arms extending from opposite ends of a shaft mounted for rotation on a frame, the crank arms being adapted to rotate the shaft about an axis with the crank arms revolving about the axis, the device comprising energy storing means, means for mounting said energy storing means on the frame, and means for connecting said energy storing means to the shaft, said connecting means being adapted to transmit motion between said energy storing means and the shaft, said energy storing means storing energy during a first portion of a revolution of the crank arms, releasing energy during a second portion of the revolution of the crank arms to assist in driving the rotation of the shaft, storing energy during a third portion of the revolution of the crank arms, and releasing energy during a fourth portion of the revolution of the crank arms to assist in driving the rotation of the shaft, said connecting means transfers energy to said energy storing means during said first and third portions of the revolution of the crank arms, and transfers energy from said energy storing means to the shaft during said second and fourth portions of the revolution of the crank arms, and wherein said connecting means transfers energy to the shaft for rotation thereof when the crank arms pass through their respective top dead center positions, said connecting means comprising a cam fixedly attached to the shaft for conjoint rotation therewith, and a cam follower attached to the said energy storing means, the cam slidably engaging the cam follower.

10. A power assist device as set forth in claim 9 wherein the cam is generally circular and the cam follower has a generally circular opening therein adapted to slidingly hold the cam.

11. A power assist device as set forth in claim 9 wherein the center of the cam is angularly offset from the crank arms relative the axis of rotation of the shaft.

12. A power assist device as set forth in claim 11 wherein the rotation of the center of the cam is angularly offset from the rotation of one of the crank arms approximately 35°.

13. In combination, a manually powered vehicle and a power assist device, the vehicle comprising a frame having wheels rotatably mounted thereon, and a drive mechanism operatively connected to at least one wheel for driving the wheel, the drive mechanism including a shaft mounted for rotation on the frame, a pair of crank arms extending from opposite ends of the shaft, and pedals mounted on the distal ends of the crank arms, the crank arms being adapted to rotate the shaft about an axis with the crank arms and pedals revolving about the axis in substantially circular orbits, the power assist device comprising energy storing means, means for mounting said energy storing means on the frame, and means for connecting said energy storing means to the shaft, said connecting means being adapted to transmit motion between said energy storing means and the shaft, said energy storing means storing means during a first portion of a revolution of the crank arms and pedals, releasing energy during a second portion of the revolution of the crank arms and pedals to assist in driving the rotation of the shaft, storing energy during a third portion of the revolution of the crank arms and pedals, and releasing energy during a fourth portion of the revolution of the crank arms and pedals to assist in driving the rotation of the shaft.

14. The combination as set forth in claim 13 wherein said connecting means transfers energy to said energy storing means during said first and third portions of the revolution of the crank arms, and transfers energy from said energy storing means to the shaft during said second and fourth portions of the revolution of the crank arms.

15. The combination as set forth in claim 14 wherein said connecting means transfers energy to the shaft for rotation thereof when the crank arms pass through their respective top dead center positions.

16. In combination, a manually powered vehicle and a power assist device, the vehicle comprising a frame having wheels rotatably mounted thereon, and a drive mechanism operatively connected to at least one wheel for driving the wheel, the drive mechanism including a shaft mounted for rotation on the frame, and a pair of crank arms extending from opposite ends of the shaft, the crank arms being adapted to rotate the shaft about an axis with the crank arms revolving about the axis, the power assist device comprising energy storing means, means for mounting said energy storing means on the frame, and means for connecting said energy storing means to the shaft, said connecting means being adapted to transmit motion between said energy storing means and the shaft, said energy storing means storing energy during a first portion of a revolution of the crank arms, releasing energy during a second portion of the revolution of the crank arms to assist in driving the rotation of the shaft, storing energy during a third portion of the revolution of the crank arms, and releasing energy during a fourth portion of the revolution of the crank arms to assist in driving the rotation of the shaft, said connecting means transferring energy to said energy storing means during said first and third portions of the revolution of the crank arms, and transferring energy from said energy storing means to the shaft during said second and fourth portions of the revolution of the crank arms, said connecting means transferring energy to the shaft for rotation thereof when the crank arms pass through their respective top dead center portions, said connecting means comprising a cam fixedly attached to the shaft for conjoint rotation therewith, and a cam follower attached to the said energy storing means, the cam slidably engaging the cam follower.

17. The combination as set forth in claim 16 wherein the cam is generally circular and the cam follower has a generally circular opening therein adapted to slidingly hold the cam.

18. The combination as set forth in claim 17 wherein the rotation of the center of the cam is angularly offset from the rotation of one of the crank arms relative the axis of rotation of the shaft.

19. The combination as set forth in claim 18 wherein said energy storing means further comprises spring means having first and second opposing ends, the first end being connected to the frame by said mounting means for pivoting motion relative the frame, and the second end being connected by said connecting means to the shaft, said spring means being displaced from a relaxed position during the first and third portions of the revolution of the crank arms, and returned to its relaxed position during the second and fourth portions of the revolution.

* * * * *